United States Patent
Katz

(10) Patent No.: US 6,177,629 B1
(45) Date of Patent: Jan. 23, 2001

(54) SPACECRAFT SOLAR ARRAY CHARGING CONTROL DEVICE

(75) Inventor: Ira Katz, Escondido, CA (US)

(73) Assignee: Maxwell Technologies, San Diego, CA (US)

( * ) Notice: Under 35 U.S.C. 154(b), the term of this patent shall be extended for 0 days.

(21) Appl. No.: 09/330,377

(22) Filed: Jun. 11, 1999

(51) Int. Cl.$^7$ ............... H01L 31/042; B64G 1/44; G05F 1/10
(52) U.S. Cl. ............... 136/292; 136/291; 136/293; 136/244; 244/173; 438/73; 438/57; 323/221; 323/906; 323/371
(58) Field of Search ............... 136/291, 292, 136/293, 244; 244/173; 438/73, 57; 323/221, 906, 371

(56) References Cited

U.S. PATENT DOCUMENTS

| | | |
|---|---|---|
| 4,190,036 | 2/1980 | Niedermeyer ............... 126/439 |
| 4,232,070 | 11/1980 | Inouye et al. ............... 428/49 |
| 4,433,201 | 2/1984 | Fellas ............... 136/251 |
| 4,482,778 | 11/1984 | Anderson ............... 136/246 |
| 4,755,231 | 7/1988 | Kurland et al. ............... 136/244 |
| 4,832,755 | 5/1989 | Barton et al. ............... 136/251 |
| 5,166,755 | 11/1992 | Gat ............... 356/419 |
| 5,439,531 | 8/1995 | Finkl ............... 136/243 |
| 5,542,988 | 8/1996 | Bogus ............... 136/244 |
| 5,594,325 | 1/1997 | Manner ............... 323/282 |
| 5,923,100 | * 7/1999 | Lukens et al. ............... 136/292 |

OTHER PUBLICATIONS

The research proposal entitled A Micro–Fabricated Field–Emission–Array System for Spacecraft/Plasma Interaction Measurement and Control (date known).

* cited by examiner

Primary Examiner—Alan Diamond
(74) Attorney, Agent, or Firm—Fitch, Even, Tabin & Flannery

(57) ABSTRACT

A charging control device for use with a spacecraft solar array employs a field emitter array including a cathode and an anode; a first resistor coupled between the cathode of the field emitter array and a solar array common; and a second resistor coupled between the anode of the field emitter array and a solar array positive.

19 Claims, 3 Drawing Sheets

SPACECRAFT SOLAR ARRAY CHARGING CONTROL DEVICE

BACKGROUND OF THE INVENTION

The present invention relates to spacecraft technology, and more specifically to static buildup of charge on spacecraft. Even more particularly, the present invention relates to methods of apparatuses for safely discharging static charge buildup on sunlit spacecraft, such as earth orbit satellites.

One problem with modern, high power, solar arrays of spacecraft in geosynchronous orbit is that the backside of the solar array is a large dark surface that collects current from a layer of earth atmosphere referred to as the magnetosphere. Front sunlit surfaces of the solar arrays are almost completely covered with a very good insulator, a solar cell cover glass. Currents collected by the large dark area can drive a chassis of the spacecraft thousands of volts negative with respect to the front sunlit surfaces of the solar array, a situation known as inverted gradient charging. This potential distribution, when it occurs to a sufficient degree, leads to arcing and is the presumed cause of several on-orbit string failures on geosynchronous orbit communication satellites.

More specifically, spacecraft charging is the buildup of charge on exposed external surfaces and dielectrics of geosynchronous spacecraft. This surface charging results from the spacecraft encountering a geomagnetic substorm environment, i.e., a plasma with particle energies from 1 to 50 keV. Two types of spacecraft charging occur. The first, called absolute charging, occurs when the ambient environment charges the entire spacecraft uniformly to a potential relative to the surrounding space plasma. The second type, called differential charging, occurs when parts of the spacecraft are charged to different negative potentials relative to each other. Differential charging can cause strong local electric fields, both on spacecraft surfaces and within dielectrics, and can be the cause of potentially damaging arcs on solar arrays.

The buildup of large potentials on the spacecraft relative to the ambient plasma is not, of itself, a serious design concern. It may compromise scientific missions seeking to measure properties of the space environment, but spacecraft systems referenced to structure ground are not affected by a uniformly charged spacecraft. However, differential charging can lead to electrostatic discharges (ESDs) that are known to have caused satellite failures. Two recently launched direct broadcast satellites, Tempo 2 and PanAm Sat 6, have lost over 20% of their solar array power due to charging induced ESD.

Differential charging occurs because spacecraft surfaces are not uniform in their material properties, surfaces are either shaded or sunlit, and/or the ambient fluxes may be anisotropic. These and other effects can produce potential differences between spacecraft surfaces or between spacecraft surfaces and spacecraft ground. When a breakdown threshold is exceeded between surfaces or within dielectrics, an electrostatic discharge can occur.

The transient generated by ESD can couple into the spacecraft electronics and cause upsets ranging from logic switching to complete system failure. The plasma created by the discharge can induce high current arcs on solar arrays and other power system components. Discharges can also cause long-term degradation of exterior surface coatings and enhance contamination of surfaces. Vehicle torquing or wobble can be produced from ESD. The ultimate results are disruptions in spacecraft operation.

Spacecraft charging results when the electron flux to spacecraft surfaces exceeds the sum of the electron flux leaving the surfaces and the ion flux to the surfaces. The incident electrons are from the magnetosphere. The electron flux from the surfaces is due to photoemission in sunlight and is about $1.0-4.0 \times 10^{-5}$ A/m$^2$. This flux is much greater than any electron flux from the magnetosphere in geosynchronous orbit. Therefore, spacecraft charging can only occur in sunlight when there are insulating surfaces on a spacecraft.

The composition and time evolution of the geosynchronous plasma environment are quite complex. It is standard practice to represent the environment in terms of a temperature and density, assuming a Maxwell-Boltzmann distribution. In that characterization, the environment is typically a cold, dense plasma with a "temperature" of about 1 eV and a density of $10^8$ particles/m$^3$. Spacecraft potentials in such an environment are less than a few volts.

During a geomagnetic substorm, changes in the solar wind cause the high-density, low-energy plasma near local midnight to be replaced by a cloud of low-density plasma, ($10^6$ to $10^7$ particles/cm$^3$) with energies from 1 to 50 keV. It is the electron flux from this environment, less than $10^{-5}$ A/m$^2$, that can charge spacecraft dielectric surfaces to thousands of volts negative and may result in an electrostatic discharge. The hot plasma cloud diffuses in a few hours but is replaced many times during the life of the storm, which may last a day or longer. For analysis, a "worst case" environment is shown in Table 1.

If the spacecraft is near local noon when the cloud appears, it may never see the hot plasma and will not charge. If the spacecraft is near midnight, it may experience charging and upsets. If the spacecraft is near local evening, as it moves toward midnight it will pass into the diffusing cloud and a more severe charging environment. If the spacecraft is near local dawn, it may be overtaken by the hot plasma. The problem for the spacecraft designer is that each of these environments represents a unique set of plasma conditions as viewed by the spacecraft and results in a markedly different charging history.

Spacecraft charging can be understood in terms of an RC circuit with non-linear current sources. The models of the circuit and current sources are discussed below. Here, we present some general characteristics of how spacecraft surface potentials change during a magnetospheric substorm.

As discussed above, spacecraft potentials change in two ways, absolute charging, where the entire spacecraft and all its surfaces charge with respect to the surrounding magnetosphere, and differential charging, where potential differences develop between spacecraft surfaces. For absolute charging the spacecraft potential changes as a whole, that is, the dielectric surface voltages are "locked" to the ground reference voltage. This type of charging occurs very rapidly (in fractions of a second), typically during eclipse. Differential charging usually occurs slowly (in minutes) and results in one part or surface of the spacecraft being charged to a potential different from those of other parts of the spacecraft. This differential charging can also change the absolute charging level of the spacecraft. This is the usual mechanism for sunlight charging, which consequently occurs slowly. A typical spacecraft charging time history is characterized by rapid absolute charging to ~6,000 volts occurring within tens of milliseconds and the differential charging of ~2,000 volts between the spacecraft chassis and the solar array cover glass occurring over a period of hours.

The spacecraft configuration is of major importance in determining spacecraft charging behavior. A three-axis-stabilized spacecraft can have a rather large negative structure potential (a few thousand volts) in sunlit charging events. The dominant areas controlling charging in this case are the backs of the solar array wings.

Worst-case environments should be used in predicting spacecraft potentials. The ambient space plasma and the solar extreme ultraviolet (EUV) are the major sources of spacecraft charging currents in the natural environment. The ambient space plasma consists of electrons, protons, and other ions. All of the particles have energies, which are often described by the "temperature" of the plasma. A spacecraft in this environment will accumulate charge until an equilibrium is reached in which the net current is zero. The net current to a surface is the sum of currents due to ambient electrons and ions, secondary electrons, and photoelectrons. The EUV-created photoelectron emissions usually dominate in geosynchronous orbits and prevent the spacecraft potential from being very negative during sunlit portions of the mission.

The density of the plasma also affects spacecraft charging. A "thin," or tenuous, plasma of less than one particle per cubic centimeter will charge the spacecraft and its surfaces more slowly than a "dense" plasma of thousands of particles per cubic centimeter. Additionally, the current due to a thin plasma can be leaked off by partially dielectric surfaces, and steady-state surface and potential differences may not be as great as those in a dense plasma.

Although the photoelectron current due to solar EUV dominates over most of the magnetosphere, in and near geosynchronous orbit during geomagnetic substorms the ambient hot electron current can control and dominate the charging process. Unfortunately the ambient plasma environment at geosynchronous orbit is very difficult to describe. To simplify this description for design purposes, typically only the isotropic currents and Maxwellian temperatures are presented, and these only for electrons and protons. Useful answers can be obtained with this simple representation. For a worst case static-charging analysis the "single Maxwellian" environmental characterization given in Table 1 is recommended.

The values given in table 1 are a 90th percentile single-Maxwellian representation of the environment. If the worst-case analysis shows that spacecraft surface differential potentials are less than 500V there should be no electrostatic discharge problem. If the worst-case analysis shows a possible problem, use of more realistic plasma parameters should be considered.

TABLE 1

Worst-case geosynchronous plasma environment

| Electron number density, $n^c$ (m$^{-3}$) | $1.12 \times 10^6$ |
| Electron temperature, $T_e$ (eV) | $1.20 \times 10^4$ |
| Ion number density, $n_i$ (m$^{-3}$) | $2.36 \times 10^5$ |
| Ion temperature, $T_i$ (eV) | $2.95 \times 10^4$ |

The electron current density from a Maxwellian plasma is $$J_{E0} = en_e \sqrt{\frac{eT_e}{2\pi m_e}}$$

$$= 2.68 \times 10^{-14} n_e \sqrt{T_e} \; A/m^2$$

where $n_e$ is the electron density in #/m$^3$, and $T_e$, is the electron temperature in electron volts. The ion current, assuming all ions are protons, is given by $$J_{I0} = en_i \sqrt{\frac{eT_i}{2\pi m_i}}$$

$$= 6.25 \times 10^{-16} n_i \sqrt{T_i} \; A/m^2$$

For example, the electron current density from the environment in Table 1 is $3.3 \times 10^6$ A/m$^2$.

In the past, spacecraft designers have successfully prevented the chassis of the spacecraft from charging negative relative to the front sunlit surfaces of the solar array by having sunlit conducting surfaces on the satellite body electrically connected to the spacecraft chassis. These sunlit conducting surfaces emit photoelectrons when in the sun, thereby keeping the chassis of the spacecraft closer to plasma ground, i.e., closer in potential to the sunlit front surfaces of the solar array. Unfortunately, a present trend to higher power spacecraft, e.g., earth orbit satellites, means that solar array areas (specifically, the large dark surfaces on the backside of the solar arrays) are larger compared with the front sunlit surfaces of the spacecraft body. Consequently, it has become more difficult for the relatively smaller photo emitting area of the spacecraft body i.e., the sunlit conducting surfaces of the spacecraft body, to emit the excess electrons collected by the large dark surfaces on the backsides of the solar array.

Field effect arrays were invented more than 30 years ago at the Stanford Research Institute. Research is ongoing at SRI, the Naval Research Lab, and other institutions. Currents of over 100 mA are achievable with a 1 mm diameter array.

Previously, an unsuccessful attempt was made to use a field emitter array to control a rocket potential in the ionosphere. Other proposals have been made to use Field emitter array's as electron emitters for tethered satellites. Thus, improvements are needed approaches for discharging static charge collected on the large dark surfaces on the backsides of solar arrays.

SUMMARY OF THE INVENTION

The present invention provides methods of apparatuses for safely discharging static charge buildup on spacecraft, such as earth orbit satellites.

In a particular embodiment, the invention can be characterized as a charging control device for use with a spacecraft solar array. The charging control device employs a field emitter array including a cathode and an anode; a first resistor is coupled between the cathode of the field emitter array and a solar array common; and a second resistor is coupled between the anode of the field emitter array and a solar array positive.

Figure 1:
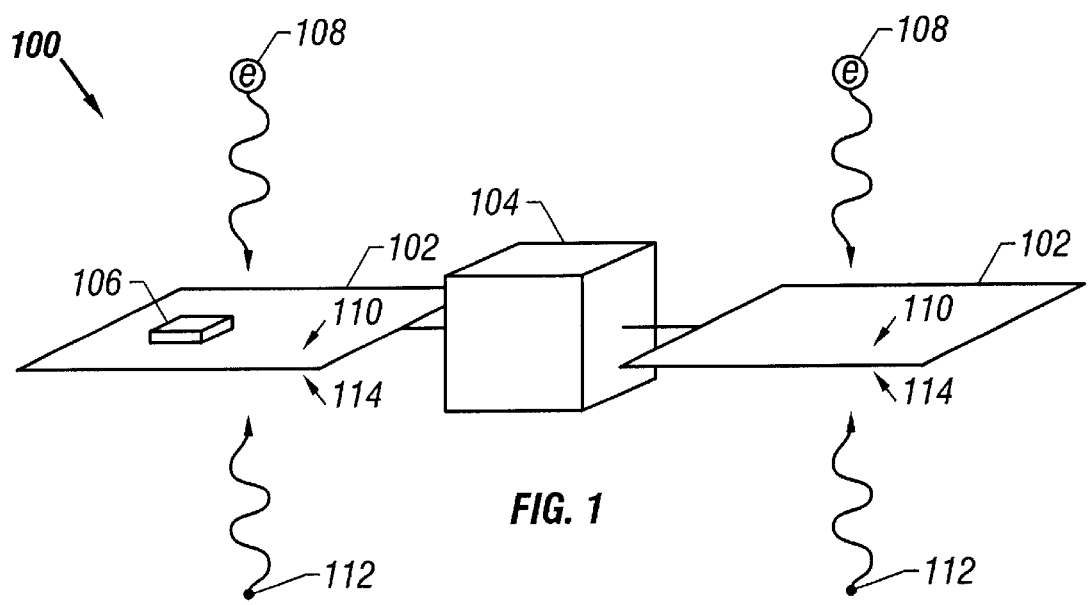
FIG. 1 is a schematic view of a spacecraft including a solar array and a solar array charging control device in accordance with one embodiment of the present invention.

The following discussion is made with reference to these figures with common reference numerals used to refer to similar structures.

DETAILED DESCRIPTION OF THE PREFERRED EMBODIMENT

The description that follows is not to be taken in a limiting sense but rather as a description of the best mode for practicing the invention. Reference to the claims should be made in order to understand the scope of the invention.

Referring first to FIG. 1, a schematic diagram of a spacecraft 100 is shown including a solar array charging control device in accordance with one embodiment of the present invention.

Shown is a solar array 102, a spacecraft body/chassis 104, and a spacecraft solar array charging control device 106. Also shown schematically are electrons 108 striking a large dark surface 110 on a backside of the solar array 102, and photons 112 (sunlight) striking a sunlit front side 114 of the solar array 102.

The solar array charging control device 106 is an active device, which, when properly configured, prevents solar array charging. The spacecraft solar array charging control device 106 uses only a few square centimeters of the backside 110, side edge (see FIG. 5), or frontside 114 of the solar array 102, weighs about two ounces, and uses less than milliwatt of power. Each of these features is important in a spacecraft design environment, because "real estate" on the solar array 102, weight and power are all at a premium. The spacecraft solar array charging control device 106 (see FIGS. 2 and 3) consists of a field emitter array and two selected resistors. One exemplary design for a field emitter array is described in the research proposal emitted "A Micro-Fabricated Field-Emission-Array System for Spacecraft/Plasma Interaction Measurement and Control" incorporated herein by reference. The resistors are coupled respectively in series between a cathode of the field emitter array and an array common, and an anode of the field emitter array and an array positive. This represents a departure from prior approaches because the solar array charging control device 106 is not directly coupled to the spacecraft body/chassis 104, thus overcoming significant problems with prior art approaches.

Figure 2:
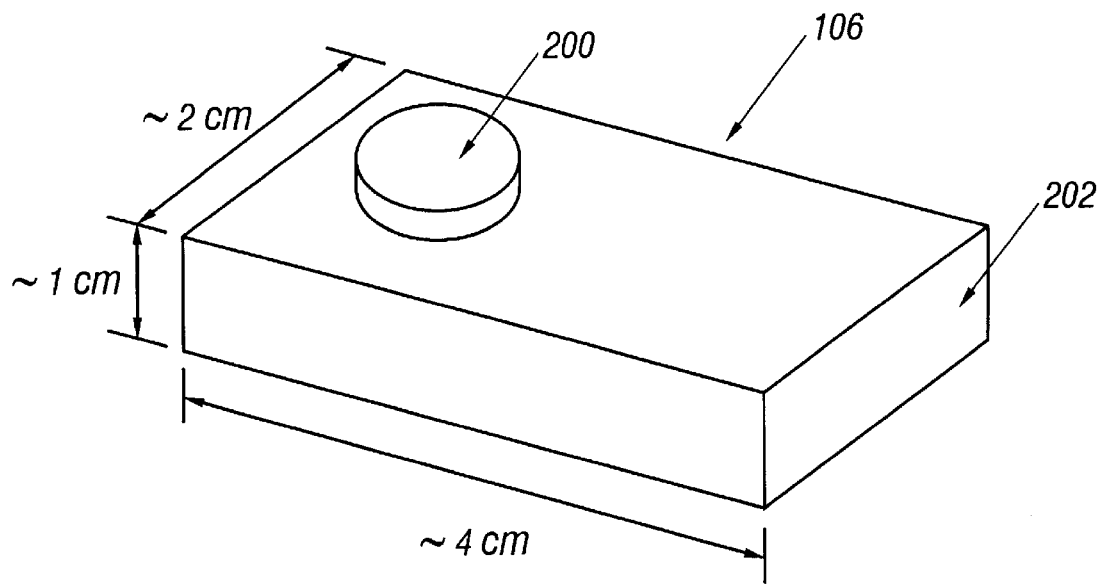
FIG. 2 is a perspective view of the spacecraft solar array charging control device of FIG. 1.

Referring to FIG. 2, a perspective view of the spacecraft solar array charging control device 106 is shown. Shown are an upper surface 200 of the field emitter array and a housing 202. The field emitter array's upper surface 200 is exposed through the housing 202 so as to facilitate the discharge of electrons from the field emitter array. The approximate size of the spacecraft solar array charging control device of the present embodiment is less than 5 square centimeters, e.g., 4 cm by 1 cm by 2 cm.

Figure 3:
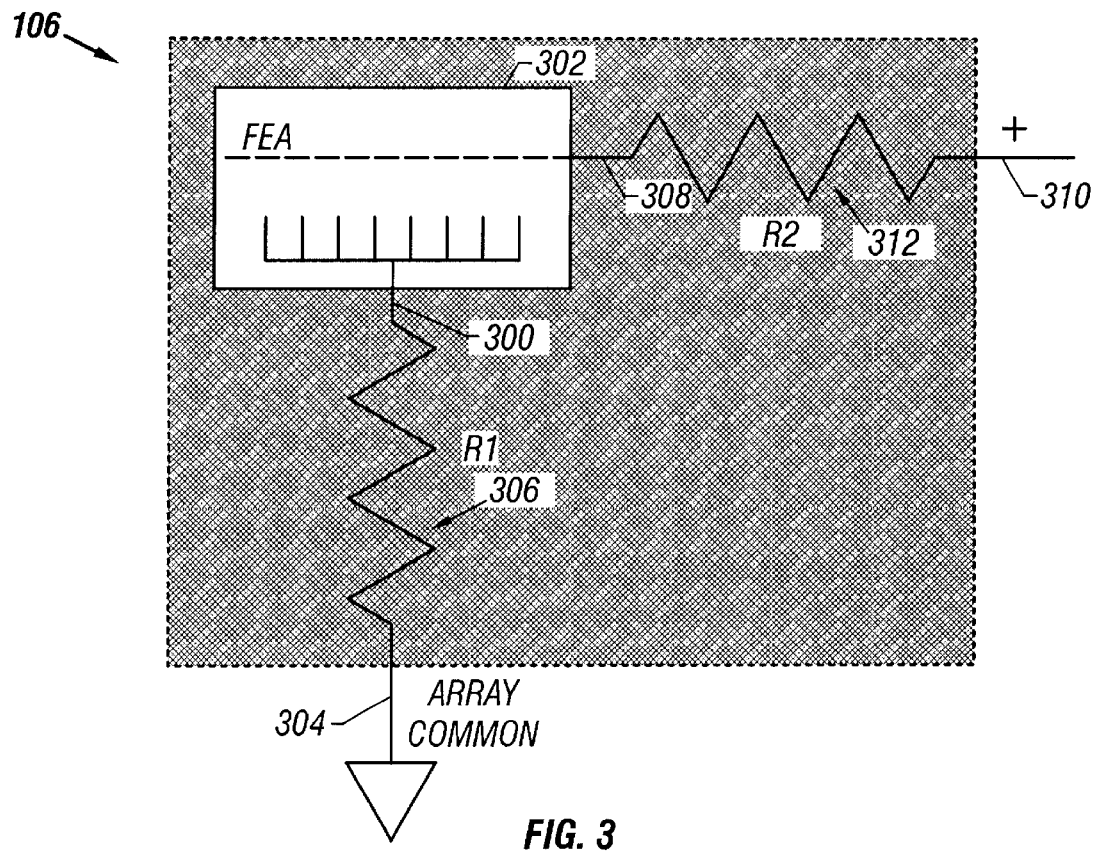
FIG. 3 is a schematic diagram illustrating components of the spacecraft solar array charging control device of FIG. 2.

Referring to FIG. 3, a schematic diagram is shown of the spacecraft solar array charging control device 106. The cathode 300 of the field emitter array 302 is coupled to a solar array common 304 through a high value resistor 306 and the anode 308 of the field emitter array 302 is connected to a solar array string positive 310, also through a high value resistor 312. Significantly, the spacecraft solar array charging control device 106 does not require direct coupling to the spacecraft body/chassis 104 (FIG. 1), thus helping to minimize connections between the solar array 102 (FIG. 1) and the spacecraft body/chassis 104 (FIG. 1). The two resistors 306, 312 prevent either internal shorts and/or shorts to ground, and thus serve as an important compliment to the basic function of the field emitter array 302. The values of the resistors 306, 312 are chosen to limit emission current and to prevent power losses if the field emitter array 302 either shorts internally or shorts to a solar array chassis as a result of, for example, meteoroid or debris damage.

Previous attempts on ATS-6, an early geosynchronous communications satellite, and SCATHA (P78-2), to prevent spacecraft charging using electron emission, without emitting a plasma, failed. The electron emission from these body-mounted devices was suppressed by potential barriers caused by differential charging.

In contrast, the spacecraft solar array charging control device 106 of the present embodiment overcomes the previous failures in two ways. First, mounting the spacecraft solar array charging control device 106 on the solar array and insuring that all local surfaces are resistively coupled to ground stops local potential barriers from forming. Second, an analysis using NASA Charging Analyzer Program (NASCAP) (a software system) before installing the spacecraft solar array charging control device 106 ensures that barrier formation does not suppress electron emission. Note that NASCAP is a readily available software system and analysis tool available to those of skill in the art.

Unlike prior approaches, the Spacecraft solar array charging control device 106 is uniquely simply powered and self regulating without electronic control circuitry and needs no command lines.

Depending on solar array control circuitry, each Spacecraft solar array charging control device 106 may need to be sized to emit the full current required by the spacecraft 100, as only a single spacecraft solar array charging control device 106 may be activated during partial loading of the solar array.

An upper bound on the current the Spacecraft solar array charging control device 106 is required to emit is the total solar array area times the electron current density calculated above. For a typical high-power communications satellite, the solar array area is on the order of 50 m$^2$, and the required emission current from the spacecraft solar array charging control device 106 will be $1.7 \times 10^{-4}$. This is an upper bound, because secondary and backscattered electron fluxes all decrease the charging current, as do any exposed and grounded sunlit conducting materials.

The value of the resistor 306 in series with the cathode, $R_1$, is found by ensuring that, including the voltage drop in the resistor 306, the spacecraft solar array charging control device 106 will emit $2 \times 10^{-4}$. The perveance, P, of the field emitter array 302 in a mission to deep space is on the order of $1.1 \times 10^{-6}$ A/V$^{3/2}$ and the field emitter array 302 needs 34 V to emit a current, I, of $2 \times 10^{-4}$ A. This means that $R_1$ is found such that the ohmic drop across $R_1$ makes up the rest of the array voltage. For a 50V array, the resistance 306, $R_1$ is about 80 K$\Omega$.

$$R_1 = \frac{(V_{array} - (I/P)^{2/3})}{I}$$

The second resistor 312, $R_2$, is between the field emitter array anode 308 and the solar array string positive 310. This connection provides the initial accelerating potential for electron emission. The value for this resistor 312, $R_2$, is found by requiring that the voltage drop across the resistor 312, $R_2$, during nominal operation be negligible, that is, under one volt. Since the leakage current is nominally less than 1% of the emission current, $$R_2 = \frac{1}{0.01 \times I}$$

For the case of an emission current of $2 \times 10^{-4}$, a suitable value for the second resistor 312, $R_2$, is about 500 KΩ.

If the spacecraft solar array charging control device shorts out, both resistors 306, 312 limit the current, and the total power, P, drained from the array is $$P = \frac{V^2}{R_1 + R_2}$$

Since the anode leakage current is nominally less than 1% of the emission current, a 500 KΩ resistor is a low resistance for nominal leakage, and provides power loss protection in the case of an internal short. The current load on the solar array 102 is limited by this resistor 312, $R_2$, to a worst case of $1.0 \times 10^{-4}$ amps, or for a 50V array, to about 5 milliwatts.

As mentioned above, the total footprint of the spacecraft solar array charging control device 106 can be less than a square inch, its weight is only a few ounces and it is mounted using RTV such as DC93-500.

Figure 4:
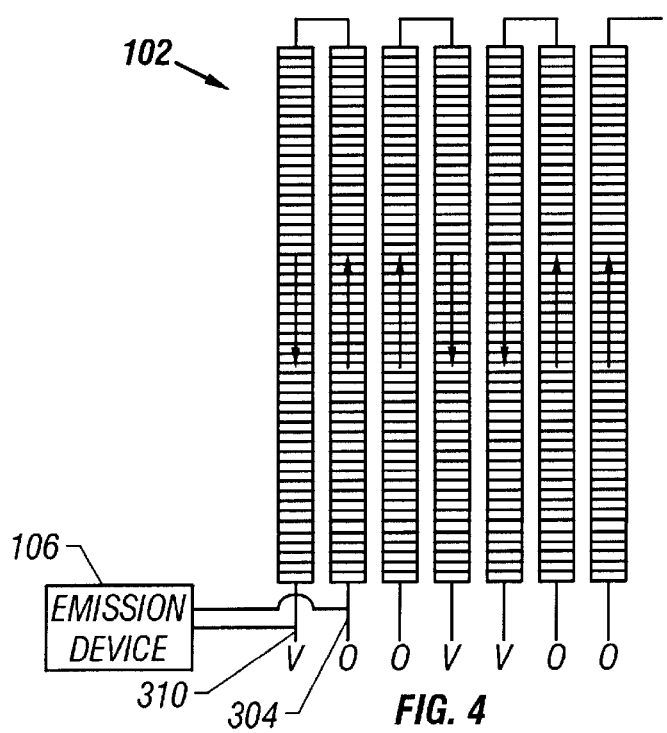
FIG. 4 is an illustration of an approach for connecting the spacecraft solar array charging control device of FIG. 2 to the solar array of FIG. 1.

Referring to FIG. 4, there are two terminals of the spacecraft solar array charging control device 106 connected to the solar array 102 and no other power or control is required. The connections to the solar array 102 are shown in FIG. 4. The surface of the exposed surfaces 106 of the housing 202 (FIG. 2) of the spacecraft solar array charging control device 106 are made of a conducting, or at least somewhat conductive, material such as black conducting polyamide. The exposed surfaces of the spacecraft solar array charging control device 106 are connected, internal to the spacecraft solar array charging control device 106, to the solar array common 304.

Figure 5:
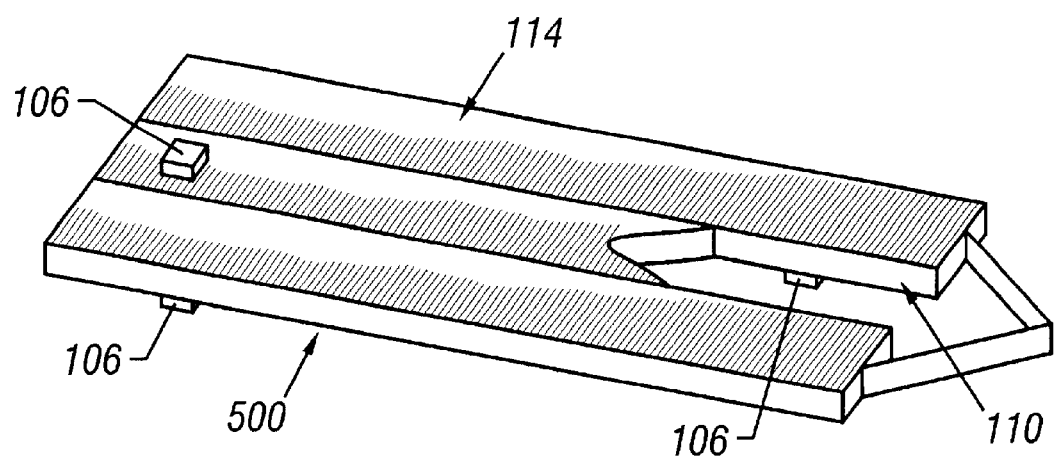
FIG. 5 is an illustration of exemplary mounting locations for the spacecraft solar array charging control device of FIG. 2 on the solar array of FIG. 1.

Referring to FIG. 5, the spacecraft solar array charging control device 106 may be attached to a front 114, back 110, or edge 500 of the solar array that has a mostly unobscured view-factor to space plasma. (Note that as illustrated, the spacecraft solar array charging control device is depicted as being located in all of the locations described above, however, such is for illustration proposes, as it is preferred that only one such location be used. Of course, it is well within the scope of the present embodiment to locate the spacecraft solar array charging control device 106 virtually anywhere on the solar array 102, either singly, or at multiple locations, using multiple spacecraft solar array charging control devices.) Locations on outboard panels are preferable to those on inboard panels. Depending on solar array controller type, it is important that at least one spacecraft solar array charging control device 106 be attached to least-often shunted strings.

An additional requirement on the location is that there be no nearby insulating surfaces that are not either sunlit or covered with a grounded resistive coating. Ideal locations include the back of carbon coated panels that have no exposed insulators, or the front surface of the solar array 102. Edge mountings are also possible if the only exposed insulator is for example, a face-sheet Kapton blanket, which is sunlit. In the case of back-surface insulators, they can be covered with a grounded, resistive material, such as carbon or germanium-coated Kapton. A NASCAP code analysis is preferably performed to ensure that there are no potential barriers in front of the location at which the spacecraft solar array charging control device 106 is positioned.

With reference to the above figures, the spacecraft solar array charging control device 106 is installed as follows:

1. Identify solar array strings that are the last to be shunted, i.e., removed from active use in powering the spacecraft (only necessary with a sequential shunt controller) so that at least one spacecraft solar array charging control devices 106 will always have power when the solar array 102 is on.

2. Pick a location on the solar array at least 0.5 meters, e.g., one meter or more, from exposed highly insulating materials. Covering such items with grounded resistively coated polymeric film is acceptable. The conductivity of the films must be enough to bleed off $3.3 \times 10^{-6}$ A/m$^2$ with less than one volt potential. This will prevent locally caused barriers.

3. Perform a NASCAP analysis using the NASA "worst case environment" with the spacecraft solar array charging control device represented as a cell of conducting material with an electron secondary yield peak adjusted so that in the "worst case environment" the secondary electron current is $2 \times 10^{-4}$ A. Allow the calculation to run for one hour. If the chassis potential remains more positive than −40 V, the location is acceptable. The calculation will have shown that potential barriers from other parts of the spacecraft won't suppress emission from the spacecraft solar array charging control device.

4. Size the two resistors as described above.

5. Attach the spacecraft solar array charging control device to the solar array string and mount, making sure that no nearby wire insulation is uncovered (e.g., 0.5 meters away), and that the spacecraft solar array charging control device has a mostly unobscured view to space.

While the above description sets forth particular embodiments of the present invention, the skilled artisan will appreciate numerous variations and embodiments within the spirit and scope of the following claims.

What is claimed is:

1. A charging control device for use with a spacecraft solar array which includes solar array strings comprising:
   a field emitter array including a cathode and an anode;
   a first resistor coupled between the cathode of the field emitter array and a solar array common; and
   a second resistor coupled between the anode of the field emitter array and a solar array positive.

2. The device of claim 1 further comprising:
   a mounting location on said spacecraft solar array; and
   the field emitter array being mounted at the mounting location.

3. The device of claim 2 wherein said mounting location is at least 0.5 meters from a nearest surface that is both shaded and non-conducting.

4. The device of claim 2 wherein said mounting location is on a shaded backside of said spacecraft solar array.

5. The device of claim 2 wherein said mounting location is on a sunlit frontside of said spacecraft solar array.

6. The device of claim 2 wherein said mounting location is on an edge of said spacecraft solar array.

7. The device of claim 2 wherein an area of said mounting location is an area having a width of at most 5 cm, and a length of at most 5 cm.

8. The device of claim 1 further including a means for drawing power directly from said spacecraft solar array.

9. The device of claim 8 wherein said means for drawing power directly from said spacecraft solar array further includes means for drawing power from solar array strings which are the last to be removed from active use in powering the spacecraft.

10. A method of installing a spacecraft solar array charging control on a spacecraft which has a solar power array including solar array strings, the method comprising the steps of:

providing a spacecraft solar array charging control device;

selecting a location on the solar power array for positioning the spacecraft solar array charging control;

analyzing the suitability of the selected location and determining whether the location is acceptable;

once the acceptability of the location is determined, sizing two resistor values for resistors to be coupled to field emitter array terminals and to a chosen solar array string; and mounting the spacecraft solar array charging control device at the selected location.

11. A method of installing a spacecraft solar array charging control as in claim 6 wherein said step of selecting a location on the solar power array for positioning the spacecraft solar array charging control includes the steps of:

identifying solar array strings that are to be removed from use in powering the spacecraft; and insuring that said selecting step includes selecting a location which allows said spacecraft solar array charging control to be electrically connected to said identified solar array strings.

12. A method of installing a spacecraft solar array charging control as in claim 10 wherin said step of analyzing the suitability of the selected location and detrmining whether the location is accepatable includes the step of:

representing the spacecraft solar array charging control as a cell of conducting material at the selected location with an electron secondary yield peak adjusted so that a secondary electron current is of a preselected amount.

13. A method of installing a spacecraft solar array charging control as in claim 12 wherein said step of analyzing the suitability of the selected location and determining whether the location is acceptable includes the step of conducting a worst case environment analysis where said secondary electron current is about $2 \times 10^{-4}$ A.

14. A device for preventing solar power array charging in a spacecraft having a solar power array which includes at least one solar array string and a solar array common, the device comprising:

a housing;

a field emitter array including a cathode and an anode;

a first resistor coupled between the cathode of the field emitter array and the solar array common; and a second resistor coupled between the anode of the field emitter array and a solar array positive.

15. The device of claim 14 wherein said field emitter array includes an upper surface which is exposed through said housing to facilitate therefrom a discharge of electrons.

16. The device of claim 15 wherein said device is mounted to said solar power array.

17. The device of claim 16 wherein said device draws operating power directly from the solar power array.

18. The device of claim 14, wherein said housing includes exposed surfaces which are comprised of conductive material.

19. The device of claim 13, wherein said conductive material is a black conducting polyamide material.

* * * * *

UNITED STATES PATENT AND TRADEMARK OFFICE
CERTIFICATE OF CORRECTION

PATENT NO. : 6,177,629 B1  
DATED : January 23, 2001  
INVENTOR(S) : Masayuki Furumiya, Keisuke Hatano, Yasutaka Nakashiba Page 1 of 1

It is certified that error appears in the above-identified patent and that said Letters Patent is hereby corrected as shown below:

Column 1,
Line 27, delete "164" insert -- 166 --

Signed and Sealed this

Thirtieth Day of October, 2001

Attest:

*Attesting Officer*

NICHOLAS P. GODICI  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,177,629 B1 | Page 1 of 1 |
| DATED | : January 23, 2001 | |
| INVENTOR(S) | : Katz | |

It is certified that error appears in the above-identified patent and that said Letters Patent is hereby corrected as shown below:

This certificate supersedes Certificate of Correction issued October 30, 2001, the number was erroneously mentioned and should be deleted since no Certificate of Correction was granted.

Signed and Sealed this

Third Day of September, 2002

Attest:

JAMES E. ROGAN
Attesting Officer     Director of the United States Patent and Trademark Office